United States Patent Office 3,530,142
Patented Sept. 22, 1970

---

3,530,142
N - (2 - BENZOXAZOLYL OR -BENZOTHIAZOLYL)-
AMINOMETHYLENE-CARBOXYLIC ACID ESTERS
Mohan Damodaran Nair and Thomas George, Goregaon,
Bombay, India, assignors to Ciba Limited, Basel, Switzerland, a Swiss company
No Drawing. Filed Nov. 21, 1967, Ser. No. 684,635
Claims priority, application Switzerland, Nov. 29, 1966, 17,082/66; Oct. 19, 1967, 14,630/67
Int. Cl. C07d 91/46, 85/48
U.S. Cl. 260—305      10 Claims

ABSTRACT OF THE DISCLOSURE

Benzheterocyclic compounds having the nucleus of the formula

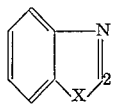

X=oxygen or sulfur, these compounds being substituted in 2-position by a group of the formula

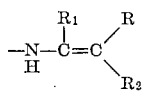

R=reactive functionally converted carboxyl group, $R_1$= hydrogen or an organic radical, and $R_2$=functionally converted carboxyl or acyl group, tautomers, oxides or salts thereof have antiviral properties.

SUMMARY OF THE INVENTION

The present invention concerns and has for its object benzheterocyclic compounds having the nucleus of the formula

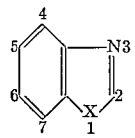
(I)

wherein X represents an oxygen or, preferably, a sulphur atom, which compounds carry in 2-position an ethenyl-amino group, the β-carbon atom of which is substituted by a reactive functionally converted carboxyl group and a functionally converted carboxyl group or an acyl group, or tautomers thereof, as well as their oxides and salts of such compounds, as well as compositions, such as pharmaceutical compositions comprising them and method for their manufacture. The compounds are useful as pharmacological, particularly as antiviral agents.

DESCRIPTION OF THE PREFERRED EMBODIMENTS

A functionally converted carboxyl group is, for example, a cyano group, or a carbamoyl or hydrazino-carbonyl group, in which the nitrogen atoms may optionally be mono- or poly-, e.g. disubstituted, for example, by lower alkyl, e.g. methyl or ethyl groups, more particularly, however an esterified carboxyl group, especially a carbo-lower alkoxy, e.g. carbomethoxy or carboethoxy group. An acyl group is, for example, an alkanoyl group, particularly a lower alkanoyl group, especially an acetyl, as well as a formyl, propionyl or n-butyryl group.

The α-carbon atom of the ethenylamino group may optionally be substituted, for example, by an aliphatic residue, especially a lower aliphatic hydrocarbon radical, such as a lower alkyl, e.g. methyl, ethyl, n-propyl, isopropyl, n-butyl or isobutyl group, or a lower alkenyl, e.g. allyl or methallyl group, or a cycloaliphatic hydrocarbon radical, such as a cycloalkyl or cycloalkyl-lower alkyl group having from 3–8, preferably 5 to 6 ring carbon atoms, such as a cyclopentyl, cyclohexyl, cyclopentylmethyl or cyclohexylmethyl group, as well as by an aromatic e.g. phenyl, or an araliphatic, such as a phenyl-lower alkyl, e.g. benzyl group, in which the aromatic portion may carry substituents, such as lower alkyl groups, lower alkoxy, e.g. methoxy, ethoxy or propyloxy groups, halogen, e.g. fluorine, chlorine or bromine atoms, trifluoromethyl groups or nitro groups.

The aromatic portion of the molecule may be unsubstituted or substituted by one or more than one of the same or different substituents attached to any of the positions available for substitution. Substituents are, for example, lower alkyl radicals, such as defined above, lower alkenyl groups, such as defined above, lower alkoxy groups, such as those defined above, lower alkylenedioxy, e.g. methylenedioxy groups, aryloxy e.g. phenyloxy groups, aryl-lower alkoxy, such as phenyl-lower alkoxy, e.g. benzyloxy groups, lower alkylmercapto, e.g. methylmercapto groups, halogen atoms, such as those mentioned above, trifluoromethyl groups, nitro groups, free or substituted amino groups, such as amino, lower alkyl-amino, e.g. methylamino, ethylamino or isopropylamino groups, di-lower alkyl-amino, e.g. dimethylamino or diethylamino groups, acylamino, such as lower alkanoyl-amino, e.g. acetylamino groups, carbamoyl-amino or thiocarbamoyl-amino, such as N-unsubstituted or N-substituted, e.g. N-phenyl- or N-lower alkyl-substituted carbamoyl-amino or thiocarbamoylamino groups, or sulfonylamino, such as phenylsulfonylamino groups, free or functionally converted carboxyl groups, such as defined before, free or functionally converted sulfo groups, such as sulfamoyl groups, or aryl or aryl-lower alkyl, such as phenyl-lower alkyl groups, e.g. phenyl, benzyl or phenylethyl groups, or bivalent aliphatic radicals, such as bivalent aliphatic hydrocarbon residues, advantageously occupying neighbouring carbon atoms of the aromatic portion of the molecule, such as lower alkylene groups having preferably four carbon atoms, e.g. the 1,4-butylene residue, or lower alkenylene groups having preferably four carbon atoms, e.g. the 1- or 2-buten-1,4-ylene or, preferably, the 1,3-butadien-1,4-ylene group, which residues, particularly aryl and bivalent residues, especially a 1,3-butadien-1,4-ylene residue, may also be substituted in the manner indicated above.

The oxides mentioned above are N-oxides, or, when X is a sulfur atom, sulfoxides and above all sulfones.

The new compounds of this invention possess valuable, pharmacological properties. Apart from antifungal properties, especially against Trichophyton, they show antiviral effects, for example, against Sindbis virus, as can be demonstrated by tests carried out on laboratory animals, such as hamsters and, primarily, anti-influenza activities, which are particularly of prophylactic nature, e.g. against influenza $PR_8$ virus, as can be demonstrated by tests using, for example, laboratory animals, such as mice, when administered by the subcutaneous or oral routes. Thus, they are useful pharmacologically, primarily as antiviral agents, which are applicable prior or after infection. Furthermore, they are useful as intermediates for the preparation of other useful products, particularly of pharmacologically active compounds, such as those described in copending application Ser. No. 684,624, filed Nov. 21, 1967.

Particularly valuable with respect to their antiviral effects, particularly their anti-influenza properties are compounds of the Formula II

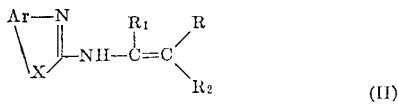

wherein R is a reactive functionally converted carboxyl group, such as a carbo-lower alkoxy group, e.g. a carbomethoxy or carbethoxy group, or a cyano group, $R_1$ is an aliphatic or cycloaliphatic hydrocarbon residue or an aryl radical, especially a lower alkyl, such as a methyl, ethyl or propyl group or above all a hydrogen atom, $R_2$ is a cyano group, or above all, a carbo-lower alkoxy group, as well as a lower alkanoyl group, especially an ethyl or propyl group or above all a hydrogen atom, $R_2$ phur, and Ar is an at most bicyclic o-arylene, especially a 1,2-phenylene or 1,2-naphthylene group, optionally carrying one or more substituents as defined before, or tautomers thereof, or salts of such compounds.

Especially valuable with respect to their antiviral effects, particularly their anti-influenza properties are compounds of the Formulae IIIa and IIIb

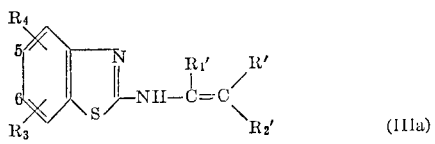

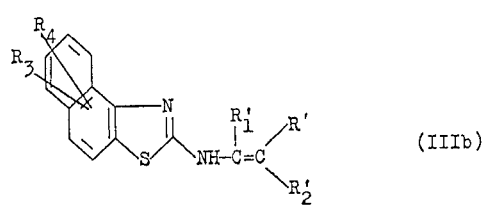

wherein R' is a carbo-lower alkoxy or a cyano group, $R_1'$ stands for a lower alkyl radical or, preferably, a hydrogen atom, $R_2'$ is a lower alkanoyl group or a cyano group or, preferably, a carbo-lower alkoxy group, and each of the groups $R_3$ and $R_4$ stands for a hydrogen atom or one of the groups mentioned before as substituting the aromatic portion, particularly a lower alkyl, e.g. methyl, ethyl or n-propyl group, a lower alkoxy, e.g. methoxy and ethoxy group, a halogen, e.g. fluorine, chlorine or bromine atom, a trifluoromethyl group, a nitro group, or a free or substituted amino group, such as an N-mono-lower alkylamino or N,N-di-lower alkylamino group, an N-acylamino, e.g. an N-lower alkanoylamino group, an N-carbamoyl-amino or N-sulfonylamino, e.g. an N-phenylsulfonylamino group, or tautomers thereof, as well as salts of such compounds.

Especially outstanding antiviral effects, particularly anti-influenza properties are shown by the compounds of the Formulae IVa and IVb

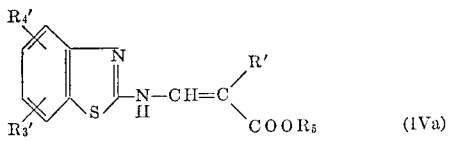

and

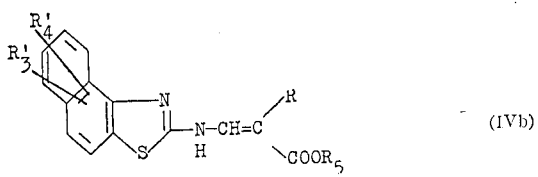

in which R' is a carbo-lower alkoxy group, as well as a cyano group, each of the groups $R_3'$ and $R_4'$ stands for a hydrogen atom, a lower alkyl group, a lower alkoxy group, a nitro group, a halogen, e.g. chlorine, bromine or fluorine atom, a trifluoromethyl group, a free or substituted amino, such as a mono- or di-lower alkylamino, e.g. methylamino or dimethylamino group, an acylamino, such as a lower alkanoylamino, e.g. acetylamino group, a phenylsulfonylamino group, or an N'-unsubstituted or N'-substituted, such as N'-phenyl or N'-lower alkyl-substituted carbamoyl-amino group, in compounds of the Formula IVa the groups $R_3'$ and $R_4'$ standing, for example, in the 6- and the 5-position, respectively, and $R_3'$ representing a hydrogen atom or a lower alkyl or a lower alkoxy group, and $R_4'$ having, with the exception of lower alkoxy, the above given meaning, and $R_6$ stands for a lower alkyl, e.g. methyl, ethyl or propyl group, or tautomers thereof or the salts of such compounds; these compounds are also particularly useful as intermediates.

Among these compounds should particularly be mentioned the diethyl N-(2-benzthiazolyl)-aminomethylene-malonate, the diethyl N-(4-trifluoromethyl-2-benzthiazolyl)-aminomethylene-malonate, the diethyl N-(4-methoxy-2-benzthiazolyl)-amino-methylene-malonate, the ethyl N-(2-naphtho[1,2-d]thiazolyl) - aminomethylene-cyanoacetate, the ethyl N-(5-bromo-2-naphtho[1,2-d]thiazolyl)-aminomethylene-cyanoacetate and the diethyl N-(2-naphtho[1,2-d]thiazolyl)-aminomethylene - malonate, or the tautomers thereof and acid addition salts of such compounds; when administered orally or subcutaneously to experimental animals, such as mice, in daily doses of about 0.05 to about 0.2 g./kg., they produce marked antiviral activity.

The new compounds are prepared by methods in themselves known, for example, by (a) reacting a benzheterocyclic compound containing the nucleus of the Formula I, in which the 2-position carries a primary amino group, or a tautomer thereof, with a carbonyl compound substituted at the carbonyl carbon atom by a methyl group carrying a reactive functionally converted carboxyl group and a functionally converted carboxyl group or an acyl group, or with an enol derivative thereof, or with a reactive functionally converted carboxylic acid and a functionally converted acetic acid substituted by a functionally converted carboxyl group or an acyl group, or (b) reacting an N'-substituted N-Z-carboxamidine compound, in which Z represents a residue, which contains the ring system of the Formula I bound through its 2-position to the nitrogen atom of the carboxamidino group, with a reactive functionally converted acetic acid substituted by a functionally converted carboxyl group or an acyl group, or (c) ring-closing an N-aryl-N'-ethenyl-urea or N-aryl-N'-ethenyl-thiourea, in which "aryl" corresponds to the carbocyclic portion of the ring system of the Formula I and at least one of the ortho-positions of the group "aryl" is unsubstituted, and in which the β-carbon atom of the ethenyl grouping contains a reactive functionally converted carboxyl group and a functionally converted carboxyl group or an acyl group.

Enol derivatives are enol ethers, particularly those containing lower alkyl, especially methyl, as well as aryl-lower alkyl, such as phenyl-lower alkyl, e.g. benzyl groups. For example, compounds having the ring system of the Formula I and carrying an amino group in the 2-position may be reacted with a lower alkoxy-methylene-malonic acid ester, -cyanoacetic acid ester, -acetoacetic acid ester or -malononitrile. Instead of the lower alkoxymethylene compounds there can be used the corresponding hydroxymethylene compounds or esters thereof, as well as aminomethylene compounds, which are capable of reacting with an amine function under elimination of water, alcohols, acids, ammonia or amines. The reaction is preferably carried out in the presence of a suitable diluent, while cooling or while heating.

Reactive functionally converted carboxylic acids are, for example, esters, particularly esters of the corresponding ortho acids, such as the lower alkyl, e.g. methyl or ethyl esters thereof; compounds of this type are, for example, orthoformic, as well as orthoacetic lower alkyl, e.g. methyl or ethyl esters. A functionally converted acetic acid substituted as indicated above is, for example, a malonic acid or cyanoacetic acid ester, such as lower alkyl, e.g. methyl or ethyl ester, as well as malononitrile.

The reaction is preferably carried out while heating; care has to be taken that the reaction is not carried through to the ring closure and the formation of compounds having the ring system of the formula

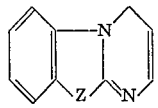

It may be performed in the absence or presence of a diluent, if necessary, in a closed vessel and/or in an atmosphere of an inert gas.

A substituent of the N'-amino group of the carboxamidine starting material is preferably an aryl group, particularly a monocyclic or bicyclic aryl, such as a phenyl group, which is cleaved off during the reaction (the latter being also preferably carried out while heating) together with the amino group. The reaction may be performed in the absence or presence of a diluent, if necessary, in a closed vessel and/or in an atmosphere of an inert gas.

The ring-closure of the urea and thiourea starting material is carried out according to per se known methods, for example, according to the Hugenschoff synthesis, such as by treatment with a halogen, particularly bromine, as well as chlorine, or with a sulfur-halogen-containing condensing agent, such as sulfuryl chloride, as well as sulfur monochloride, preferably in the presence of a suitable inert solvent, such as chloroform, ethylenedichloride, chlorobenzene, nitrobenzene or acetic acid, if necessary, while cooling or heating and/or in the atmosphere of an inert gas.

The starting materials are known or may be prepared according to known methods. Thus, one may, for example, react an arylisocyanate or arylisothiocyanate with an ethenylamine, in which the β-carbon atom contains a reactive functionally converted carboxyl group and a functionally converted carboxyl group or an acyl group as substituents and obtain the desired starting material for the process modification (c).

The invention further includes any modification of the present process, in which an intermediate product resulting at any stage of the process is used as the starting material and any remaining steps are carried out, or the process is discontinued at any stage, or in which a starting material is formed under reaction conditions or used in the form of a derivative, such as a salt thereof.

The invention also includes any new intermediate products that are formed. Advantageously, one uses starting materials, which lead to the preferred compounds previously mentioned.

Depending on the reaction conditions, the new compounds are obtained in free form or in the form of their salts, which are likewise included within the scope of the present invention. Depending on the substituents present, basic, neutral, acid or mixed salts, which may possibly also be in the form of their hemi-, mono-, sesqui- or polyhydrates, may be obtained. The salts of the new compounds can be converted in the known manner into the free compounds, as well as into other salts, acid addition salts, for example, by treatment with basic reagents, such as alkaline reagents or ion-exchange resins, salts with bases by reaction with acid agents, such as acids. A resulting compound with a free carboxyl group can form salts, especially non-toxic salts with bases, such as alkaline metal, alkaline earth metal or ammonium salts, for example, by treatment with metal hydroxides, especially alkali metal or alkaline earth metal hydroxides, such as the sodium hydroxide, potassium hydroxide or calcium hydroxide, or with alkali metal carbonates, such as sodium or potassium carbonate, with ammonia or with organic amines, as well as with acids. Acid addition salts are preferably therapeutically acceptable, non-toxic acid addition salts, for example, with inorganic acids, such as hydrohalic acids, e.g. hydrochloric or hydrobromic acid, sulfuric, phosphoric, nitric, or perchloric acid, or with organic acids, such as aliphatic, alicyclic, aromatic or heterocyclic carboxylic or sulfonic acids, e.g. formic, acetic, propionic, succinic, glycollic, lactic, malic, tartaric, citric, hydroxymaleic, pyruvic, phenylacetic, benzoic, p-aminobenzoic, anthranilic, p-hydroxybenzoic, salicylic, p-aminosalicylic, embonic, methanesulfonic, ethanesulfonic, hydroxyethanesulfonic, ethylenesulfonic, halogeno-benzenesulfonic, toluenesulfonic, naphthalenesulfonic, N-cyclohexyl-sulfamic or sulfanilic acid, methionine, tryptophan, lysine or arginine, as well as ascorbic acid.

The afore-mentioned and other salts of the new compounds, for example, the picrates, may also be used for purifying the resulting free compounds by converting the free compound into a salt thereof, isolating the latter and liberating the free compound again from the salt. Taking into consideration the close relationship between the new compounds in free form and in the form of their salts, whenever the free compounds or the salts are mentioned above or hereinafter, the corresponding salts and free compounds, respectively, are likewise understood, whenever this is feasible.

The new compounds may be used in the form of pharmaceutical compositions, which contain them in free form or in the form of their salts in admixture or conjunction with an organic or inorganic, solid or liquid pharmaceutical carrier suitable for enteral, e.g. oral, or parenteral administration. Suitable carrier materials are substances which are inert toward the new compounds, for example, water, gelatine, sugars, e.g. lactose or glucose, starches, such as wheat or corn starch, stearyl alcohol, stearic acid or salts thereof, e.g. magnesium stearate, talcum, vegetable oils, benzyl alcohols, gums, polyethylene glycols, white petroleum jelly or other known medicinal excipients. The pharmaceutical preparations may be in solid form, e.g. as tablets, dragees, capsules or suppositories, or in liquid form, e.g. as solutions, suspensions or emulsions. They may be sterilised and/or may contain auxiliaries, such as preservatives, stabilizers, wetting agents or emulsifiers, solubilizers, salts for regulating the osmotic pressure or buffers. The pharmaceutical preparations which may also contain other therapeutically valuable substances, are formulated by the usual methods.

The new compounds may also be used in veterinary medicine, for example, in one of the afore-mentioned forms or as additives to animal feedstuffs, using, for example, the conventional extending and diluting agents or feedstuffs, respectively.

The following examples illustrate the invention. Temperatures are given in degrees centigrade.

EXAMPLE 1

A mixture of 5 g. of 2-aminobenzthiazole and 10 ml. of diethyl ethoxymethylene-malonate in 70 ml. of ethanol is heated under reflux for 20 hours. Upon concentration and cooling the product crystallizes out. Recrystallization from ethanol affords the diethyl N-(2-benzthiazolyl)-aminomethylene-malonate of the formula

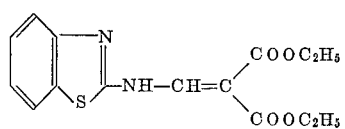

M.P. 106–107°.

The following compounds are prepared by the process illustrated above by selecting the appropriate starting materials:

diethyl N-(6-ethoxy-2-benzthiazolyl)-aminomethylene-malonate, M.P. 142–143° after recrystallization from ethanol;

diethyl N-(6-ethoxy-2-benzthiazolyl)-aminomethylene-malonate, M.P. 138–139° after recrystallization from ethanol;

diethyl N-(6-methoxy-2-benzthiazolyl)-aminomethylene-malonate, M.P. 148–149° after recrystallization from ethanol;

diethyl N-(4-chloro-2-benzthiazolyl)-aminomethylene-malonate, M.P. 116–117° after recrystallization from ethanol;

diethyl N-(5,6-dimethyl-2-benzothiazolyl)-aminomethylenemalonate, M.P. 135–136° after recrystallization from ethanol;

diethyl N-(6-nitro-2-benzthiazolyl)-aminomethylene-malonate, M.P. 211–212° after recrystallization from ethanol, as well as diethyl N-(4,6-dichloro-2-benzthiazolyl)-aminomethylene-malonate, M.P. 153–154° after crystallization from ethanol.

EXAMPLE 2

A solution of 5.8 g. of 2-amino-4-phenyl-benzthiazole and 12 ml. of diethyl ethoxymethylene-malonate in 150 of ethanol is heated under reflux for 24 hours. The solution is then concentrated to 25 ml. and cooled, whereupon the product crystallizes out. It is recrystallized from ethanol to afford the diethyl N-(4-phenyl-2-benzthiazolyl)-aminomethylene malonate of the formula

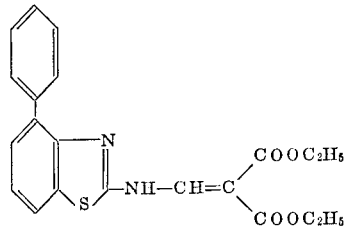

M.P. 101–102°.

The starting material is prepared as follows:

A suspension of 6.9 g. of N-(2-biphenylyl)-thiourea in 150 ml. of dry chloroform is heated while stirring with a solution of 4.8 g. of bromine in 20 ml. of chloroform, then refluxed for 20 minutes with the exclusion of moisture. After cooling, the reaction mixture is washed with an aqueous sodium bisulphite solution, then with aqueous ammonium hydroxide, the chloroform layer is dried and evaporated, and the residue is crystallized from ethanol to yield the 2-amino-4-phenyl-benzthiazole, M.P. 205–206°.

EXAMPLE 3

To a solution of 16.8 g. of 2-amino-4-(4-chlorophenyloxy)-benzthiazole in 150 ml. of ethanol is added 12 g. of diethyl ethoxymethylene-malonate; the mixture is heated for 20 hours under reflux, the solution is concentrated and cooled, and the separated crystalline material is recrystallized from a mixture of acetone and hexane to yield the diethyl N-[4-(4-chlorophenyloxy)-2-benzthiazolyl]-aminomethylene malonate of the formula

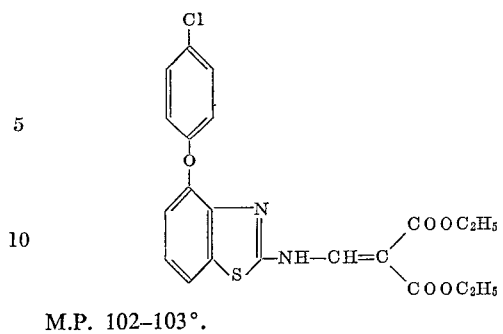

M.P. 102–103°.

The starting material is prepared as follows:

A solution of 26 g. of 2-(4-chlorophenyloxy)-phenyl-isothiocyanate in 100 ml. ethanol is treated with 50 ml. of concentrated aqueous ammonia and kept for 16 hours with occasional shaking. The ethanol is removed and the residue is crystallized from a mixture of benzene and n-hexane to give 2-(4 - chloro-phenyloxy)-phenyl-thiourea, M.P. 141–142°, which is converted to 2-amino-4-(4-chlorophenyloxy) - benzthiazole, M.P. 172–173°, by oxidation with bromine as described in Example 2.

EXAMPLE 4

A solution of 28.5 g. of 2-amino-naphtho[1,2]thiazole in 450 ml. of ethanol is treated with 29 g. of diethyl ethoxymethylene-malonate; the mixture is heated for 24 hours under reflux, then concentrated and cooled. The crystalline material is recrystallized from ethyl acetate to afford the diethyl N-(2-naphtho[1,2-d]thiazolyl)-aminomethylene-malonate of the formula

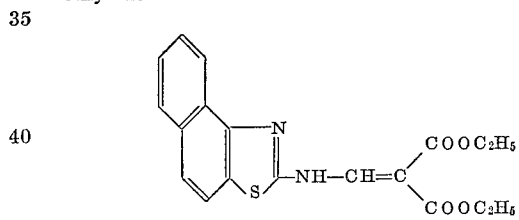

melting at 160–161°.

EXAMPLE 5

A mixture of 20 g. of 2-amino-naphtho[2,1-d]thiazole and 20 g. of diethyl ethoxymethylene-malonate in a mixture of 80 ml. of dimethyl formamide and 30 ml. of methanol is heated under reflux for 2 hours; the solution is concentrated and cooled to afford the diethyl N - (2 - naphtho[2,1-d]thiazolyl) - aminomethylene-malonate of the formula

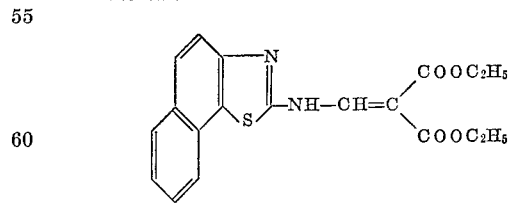

which melts at 114–116° after recrystallization from ethanol.

EXAMPLE 6

A solution of 5 g. of 2-amino-6-ethoxy-benzthiazole and 8 g. of ethyl ethoxymethylene-cyanoacetate in 50 ml. of ethanol is allowed to stand for 20 minutes at room temperature and is then evaporated under reduced pressure and at room temperature. The residual oil is treated with 25 ml. of benzene and allowed to stand for 16 hours. The crystalline product is collected and recrystallized from benzene to yield the ethyl N-(6-ethoxy-2- benzthiazolyl) - aminomethylene - cyanoacetate of the formula

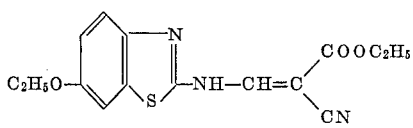

M.P. 165–166°.

EXAMPLE 7

A mixture of 5 g. of 2-amino-4-trifluoromethylbenzthiazole hydrobromide and 10 ml. diethyl ethoxymethylene-malonate in 70 ml. of ethanol is heated under reflux for 16 hours, then concentrated and cooled. The precipitate is filtered off and recrystallized from ethanol to yield the diethyl N - (4-trifluoromethyl-2-benzthiazolyl)-aminomethylene-malonate of the formula

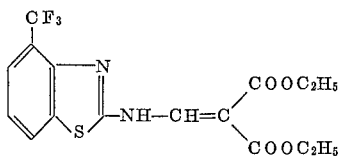

M.P. 135–136°.

The stirring material used in the above reaction is prepared as follows: A solution of 3 g. of N-(2-trifluoromethyl-phenyl)-thiourea in 20 ml. of acetic acid is treated while stirring with 3 g. of bromine, added dropwise during 30 minutes. The precipitate is filtered off and recrystallized from a mixture of ethanol and ether to yield the 2 - amino-4-trifluoromethyl-benzthiazole hydrobromide, M.P. 152–153° (with decomposition).

EXAMPLE 8

A solution of 13 g. of diethyl ethoxymethylene-malonate in 50 ml. of tetrahydrofuran is treated dropwise at 0° with a solution of 8 g. of 2-amino-benzoxazole in 75 ml. of tetrahydrofuran while stirring. The solution is allowed to come to room temperature; stirring is continued for 12 hours. After evaporation of the solvent, the residual oil is treated with a mixture of ether and hexane. The crystalline precipitate is filtered and recrystallized from ethanol to afford the diethyl N-(2-benzoxazolyl)-aminomethylene-malonate of the formula

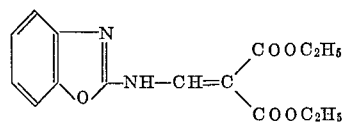

M.P. 106–107°.

EXAMPLE 9

A solution of 6 g. of ethyl ethoxymethylene-cyanoacetate in 50 ml. of tetrahydrofuran is treated dropwise at 0° with a solution of 5.28 g. of 2-amino-benzoxazole in 50 ml. of tetrahydrofuran while stirring. The solution is allowed to come to room temperature; stirring is continued for 12 hours. The residual oil obtained on evaporation of the solvent crystallizes on trituration with a few drops of ether. Recrystallization from ethanol affords the ethyl N - (2-benzoxazolyl)-aminomethylene-cyanoacetate of the formula

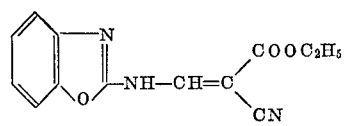

M.P. 164°.

EXAMPLE 10

A solution of 4.5 g. of 2-amino-4-methoxy-benzthiazole in 50 ml. of ethanol is treated with 5 g. of diethyl ethoxy-methylene-malonate, and the mixture is heated under reflux for 20 hours. The solution is concentrated and cooled, and the residue is crystallized from a mixture of benzene and hexane to afford the diethyl N-(4-methoxy-2-benzthiazolyl)-aminomethylene-malonate of the formula

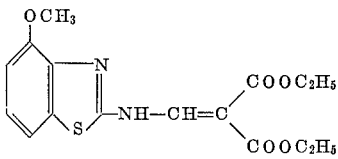

M.P. 149–150°.

The following compounds are prepared according to the procedure described above by selecting the appropriate starting materials:

diethyl N-(4-methyl-2-benzthiazolyl)-aminomethylene-malonate, M.P. 82–83° after crystallization from n-hexane;

diethyl N-(4-fluoro-2-benzthiazolyl)-aminomethylene-malonate, M.P. 126–127° after crystallization from ethanol;

diethyl N-(6-trifluoromethyl-2-benzthiazolyl)-aminomethylene-malonate, M.P. 147–148° after crystallization from ethanol;

diethyl N-(5-trifluoromethyl-2-benzthiazolyl)-aminomethylene-malonate, M.P. 155–156° after crystallization from ethanol, and diethyl N-(4-nitro-2-benzthiazolyl)-aminomethylene-malonate, M.P. 128–129° after crystallization from ethanol.

EXAMPLE 11

To a solution of 8.4 g. of 2-amino-5-bromo-naptho [1,2-d]thiazole in a mixture of 50 ml. of dimethyl formamide and 50 ml. of ethanol is added 5.1 g. of ethyl ethoxymethylene-cyanoacetate; the mixture is heated under reflux for 20 hours on the water bath, then concentrated and cooled. The crystalline product is crystallized from a mixture of. dimethyl formamide and ethanol to afford the ethyl N-(5-bromo-2-naphtho[1,2-d]thiazolyl)-aminomethylene-cyanoacetate of the formula

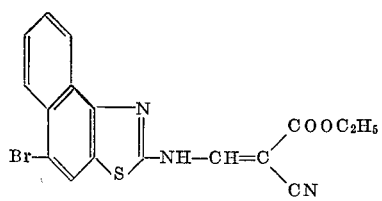

M.P. 266–267°.

EXAMPLE 12

A solution of 4 g. of 2-amino-naphtho[1,2-d]thiazole in 40 ml. of ethanol is treated with 3.5 g. of ethyl ethoxymethylene-cyanoacetate, and the mixture is heated under reflux for one hour, then concentrated and cooled. The solid material is crystallized from a mixture of ethanol and benzene to afford the ethyl N-(2-naphtho[1,2-d]thiazolyl)-aminomethylene-cyanoacetate of the formula

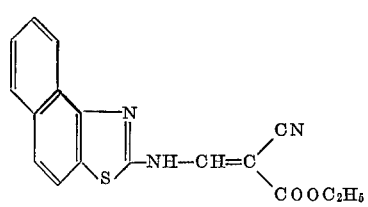

M.P. 203–205°.

EXAMPLE 13

Tablets containing 0.02 g. of the active substance are prepared as follows:

Ingredients (For 5000 tablets):

| | G. |
|---|---|
| Diethyl N-(2-benzthiazolyl)-aminomethylene-malonate | 100 |
| Corn starch | 800 |
| Talc | 70 |
| Magnesium stearate | 30 |
| Distilled water, q.s. | |

The diethyl N-(2-benzthiazolyl)-aminomethylene-malonate is mixed intimately with 500 g. of corn starch. A paste prepared from 300 g. of corn starch and 1000 ml. of distilled water is added to the above mixture. The mass is well-kneaded, granulated and dried at 45°. A mixture of the talc and magnesium stearate is added to the above granules and mixed well and the granulate is then compressed into tablets of 0.2 g. weight.

Tablets containing 0.04 g. of the active substance are obtained, for example, by comprising the above granulate into tablets of 0.4 g. weight.

EXAMPLE 14

Tablets containing 0.03 g. of the active substance are produced as follows:

Ingredients (For 10,000 tablets):

| | G. |
|---|---|
| Diethyl N-(2-naphthol[1,2-d]-thiazolyl)-amino-methylene-malonate | 300 |
| Corn starch | 1500 |
| Talc | 140 |
| Magnesium stearate | 60 |
| Distilled water, q.s. | |

The tablets are produced by the method described in Example 13.

EXAMPLE 15

A solution of 11.1 g. of 2-amino-5-bromo-naphtho-[1,2-d]thiazole in a mixture of 60 ml. of dimethyl formamide and 60 ml. of ethanol is treated with 8 g. of diethyl ethoxymethylene-malonate; the mixture is heated under reflux for 24 hours, then concentrated and cooled. The resulting diethyl N-(5-bromo-2-naphtho[1,2-d]-thiazolyl)-aminomethylene-malonate of the formula

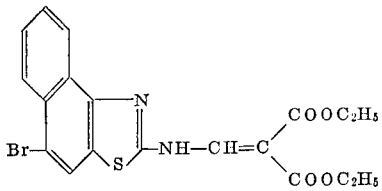

melts at 164–165° after crystallization from ethyl acetate.

EXAMPLE 16

A solution of 6 g. of 2-amino-naphtho[1,2-d]thiazole in 100 ml. of ethanol is treated with 5.6 g. of ethyl ethoxymethylene-acetoacetate; the mixture is heated under reflux for 30 minutes, then concentrated and cooled. The resulting ethyl N-(2-naphtho[1,2-d]thiazolyl)-aminomethylene-acetoacetate of the formula

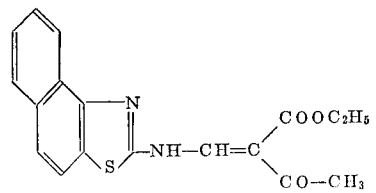

melts at 170–171° after crystallization from benzene.

EXAMPLE 17

A mixture of 6.44 g. of N-phenyl-N'-(2,2-di-carbethoxy-vinyl)-thiourea in 50 ml. of dry chloroform and 4 g. of bromine in 100 ml. of dry chloroform is heated under reflux for 6 hours. The solvent is then removed under reduced pressure, the residue is taken up in water and the aqueous mixture is basified with 2 N aqueous sodium hydroxide. The resulting solid is filtered off, washed with water, dried and crystallized from ethanol to afford the diethyl N-(2-benzthiazolyl)-aminomethylene-malonate, M.P. 106–107°.

The starting material can be prepared as follows:

A mixture of phenyl-isothiocyanate and 18.7 g. of diethyl aminomethylene-malonate is heated for 12 hours at 160–170°, then cooled and triturated with benzene. The solid material is filtered off and crystallized from benzene to yield the N - phenyl - N' - (2,2 - di - carbethoxy-vinyl)-thiourea, which is used without further purification.

We claim:

1. A member selected from the group consisting of compounds of the formula

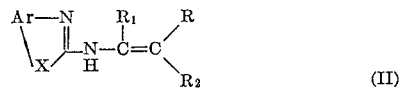

in which $R_1$ is a member selected from the group consisting of hydrogen, lower alkyl, lower alkenyl, cyclopentyl, cyclohexyl, cyclopentyl-lower alkyl and cyclohexyl-lower alkyl, R is a member selected from the group consisting of cyano, carbamoyl, hydrazino-carbonyl, N-lower alkylated carbamoyl, N-lower alkylated hydrazino-carbonyl and carbo-lower alkoxy, $R_2$ is a member selected from the group consisting of a carbo-lower alkoxy, cyano, lower alkanoyl, carbamyl and hydrazinocarbonyl group, X stands for a member selected from the group consisting of oxygen and sulfur, and Ar is a member selected from the group consisting of a member selected from the group consisting of o-phenylene and o-naphthylene and such group substituted by a member selected from the group consisting of lower alkyl, lower alkenyl, lower alkoxy, lower alkylenedioxy, phenoxy, phenyl-lower alkoxy, halogeno-phenyloxy lower alkylmercapto, trifluoromethyl, nitro, amino, lower alkylamino, di-lower alkylamino, lower alkanoylamino, carbamoylamino, thio-carbamoylamino, sulfonylamino, carboxy, carbo-lower alkoxy, cyano, sulfo, sulfamoyl, phenyl, phenyl-lower alkyl and halogeno, tautomers thereof, oxides thereof and pharmaceutically acceptable salts of such compounds.

2. A compound as claimed in claim 1 and being selected from the group consisting of a compound having one of the formulae

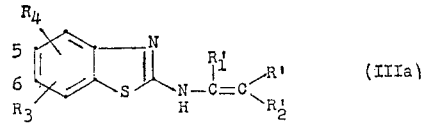

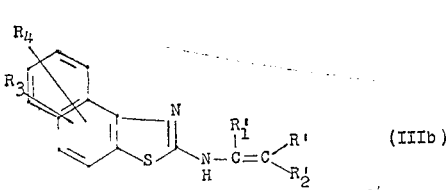

in which R' is a member selected from the group consisting of carbo-lower alkoxy and cyano, $R_1'$ is a member selected from the group consisting of hydrogen and lower alkyl, $R_2'$ is a member selected from the group consisting of carbo-lower alkoxy, cyano and lower alkanoyl, and each of $R_3$ and $R_4$ is a member selected from the group consisting of hydrogen, lower alkyl, lower alkenyl, lower alkoxy, phenoxy, phenyl-lower alkoxy, halogeno-phenyloxy, lower alkylmercapto, trifluoromethyl, nitro, amino, lower alkylamino, di-lower alkylamino, lower alkanoylamino, carbamoylamino, thiocarbamoylamino, sulfonylamino, carboxy, carbo-lower alkoxy, cyano, sulfo, sulfamoyl, phenyl, phenyl-lower alkyl and halogeno, and, when taken together, lower alkylenedioxy, tautomers thereof and pharmaceutically acceptable salts of such compounds.

3. A compound as claimed in claim 2 and being selected from the group consisting of a compound having one of the Formulae IIIa and IIIb given in claim 2, in which each of R', $R_1'$ and $R_2'$ have the meaning given in claim 2, and each of $R_3$ and $R_4$ stands for a member selected from the group consisting of hydrogen, lower alkyl, lower alkoxy, trifluoromethyl, nitro, free amino, lower alkylamino, di-lower alkylamino, lower alkanoylamino, carbamoylamino, sulfonylamino and halogeno, tautomers thereof and pharmaceutically acceptable salts of such compounds.

4. A compound as claimed in claim 1 and being selected from the group consisting of a compound having one of the formulae

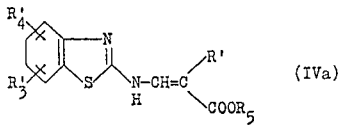

and

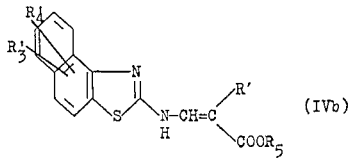

in which R' is a member selected from the group consisting of carbo-lower alkoxy and cyano, each of $R_3'$ and $R_4'$ is a member selected from the group consisting of hydrogen, lower alkyl, lower alkoxy, nitro, trifluoromethyl, amino, lower alkyl-amino, di-lower alkyl-amino, lower alkanoylamino, phenylsulfonylamino, carbamoylamino, N'-phenylcarbamoylamino, N'-lower alkylcarbamoylamino and halogeno, and $R_5$ is lower alkyl, tautomers thereof and pharmaceutically acceptable salts of such compounds.

5. A compound as claimed in claim 1 and being a member selected from the group consisting of diethyl N-(2-benzthiazolyl) - aminomethylene - malonate, tautomers thereof and pharmaceutically acceptable salts of such compounds.

6. A compound as claimed in claim 1 and being a member selected from the group consisting of diethyl N - (4 - trifluoromethyl - 2 - benzthiazolyl) - aminomethylene-malonate, tautomers thereof and pharmaceutically acceptable salts of such compounds.

7. A compound as claimed in claim 1 and being a member selected from the group consisting of diethyl N - (4 - methoxy - 2 - benzthiazolyl) - aminomethylene-malonate, tautomers thereof and pharmaceutically acceptable salts of such compounds.

8. A compound as claimed in claim 1 and being a member selected from the group consisting of ethyl N - (2 - naphtho[1,2 - d]thiazolyl) - aminomethylenecyanoacetate, tautomers thereof and pharmaceutically acceptable salts of such compounds.

9. A compound as claimed in claim 1 and being a member selected from the group consisting of ethyl N - (5 - bromo - 2 - naphtho[1,2 - d]thiazolyl) - aminomethylene-cyanoacetate, tautomers thereof and pharmaceutically acceptable salts of such compounds.

10. A compound as claimed in claim 1 and being a member selected from the group consisting of diethyl N - (2 - naphtho[1,2 - d]thiazolyl) - aminomethylene-malonate, tautomers thereof and pharmaceutically acceptable salts of such compounds.

References Cited
UNITED STATES PATENTS
3,417,082  12/1968  Taylor _____ 260—305

ALEX MAZEL, Primary Examiner

R. J. GALLAGHER, Assistant Examiner

U.S. Cl. X.R.

260—251, 307; 424—200, 270, 272